United States Patent
Salkintzis et al.

(10) Patent No.: US 11,277,847 B2
(45) Date of Patent: Mar. 15, 2022

(54) ESTABLISHING QOS FLOWS OVER NON-3GPP ACCESS

(71) Applicant: Lenovo (Singapore) PTE. LTD., New Tech Park (SG)

(72) Inventors: Apostolis Salkintzis, Athens (GR); Roozbeh Atarius, La Jolla, CA (US); Dimitrios Karampatsis, Ruislip (GB); Genadi Velev, Darmstadt (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 19 days.

(21) Appl. No.: 16/856,495

(22) Filed: Apr. 23, 2020

(65) Prior Publication Data

US 2020/0344769 A1    Oct. 29, 2020

Related U.S. Application Data

(60) Provisional application No. 62/837,677, filed on Apr. 23, 2019.

(51) Int. Cl.

| | |
|---|---|
| *H04W 72/08* | (2009.01) |
| *H04W 12/08* | (2021.01) |
| *H04W 28/26* | (2009.01) |
| *H04W 28/02* | (2009.01) |

(52) U.S. Cl.
CPC ......... *H04W 72/087* (2013.01); *H04W 12/08* (2013.01); *H04W 28/0268* (2013.01); *H04W 28/26* (2013.01)

(58) Field of Classification Search
CPC ............... H04W 72/087; H04W 12/08; H04W 28/0268; H04W 28/26
USPC ................ 370/329, 328, 338, 341, 345, 350
See application file for complete search history.

(56) References Cited

U.S. PATENT DOCUMENTS

| | | | |
|---|---|---|---|
| 11,019,539 B2* | 5/2021 | Sayenko | H04W 36/0016 |
| 11,096,082 B2* | 8/2021 | Youn | H04W 28/0263 |
| 2002/0062379 A1* | 5/2002 | Widegren | H04L 65/80 |
| | | | 709/227 |

(Continued)

OTHER PUBLICATIONS

3GPP, "3rd Generation Partnership Project; Technical Specification Group Radio Access Network; NG-RAN; NG Application Protocol (NGAP) (Release 15)", 3GPP TS 38.413 V15.3.0, Mar. 2019, pp. 1-319.

(Continued)

*Primary Examiner* — Nghi H Ly
(74) *Attorney, Agent, or Firm* — Kunzler Bean & Adamson

(57) ABSTRACT

Apparatuses, methods, and systems are disclosed for providing enhanced QoS via a non-3GPP access network. One apparatus includes a transceiver communicates with a gateway function in a non-3GPP access network. The apparatus includes a processor that receives a create security association request for each of at least one security association. Here, each create security association request includes additional QoS information for the security association. The processor reserves, for each create security association request, at least one access resource in the access network based on the additional QoS information and sends a create security association response to the gateway function for each create security association request, each create security association response indicating whether the corresponding security association is accepted.

12 Claims, 8 Drawing Sheets

(56) References Cited

U.S. PATENT DOCUMENTS

2003/0120135 A1\* 6/2003 Gopinathan ........... G16H 50/20
600/300

OTHER PUBLICATIONS

3GPP, "3rd Generation Partnership Project; Technical Specification Group Services and System Aspects; Procedures for the 5G System; Stage 2 (Release 16)", 3GPP TS 23.502 V16.0.2, Apr. 2019, pp. 1-419.

3GPP, "3rd Generation Partnership Project; Technical Specification Group Services and System Aspects; System Architecture for the 5G System; Stage 2 (Release 16)", 3GPP TS 23.501 V16.0.2, 2019, pp. 1-317.

\* cited by examiner

ESTABLISHING QOS FLOWS OVER NON-3GPP ACCESS

CROSS-REFERENCE TO RELATED APPLICATIONS

This application claims priority to U.S. Provisional Patent Application No. 62/837,677 entitled "Establishing a 5G Data Session Over Non-3GPP Access" and filed on Apr. 23, 2019 for Apostolis Salkintzis, Roozbeh Atarius, and Dimitris Karampatsis, which application is incorporated herein by reference.

FIELD

The subject matter disclosed herein relates generally to wireless communications and more particularly relates to establishing a 5G data session (e.g., a PDU Sessions) over non-3GPP access with enhanced QoS support.

BACKGROUND

The following abbreviations and acronyms are herewith defined, at least some of which are referred to within the following description.

Third Generation Partnership Project ("3GPP"), Access and Mobility Management Function ("AMF"), Access Network Performance ("ANP"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-3GPP Interworking Function ("N3IWF"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), Quadrature Phase Shift Keying ("QPSK"), Registration Area ("RA"), Radio Access Network ("RAN"), Radio Access Technology ("RAT"), Radio Resource Control ("RRC"), Receive ("RX"), Session and Service Continuity ("SSC"), Switching/Splitting Function ("SSF"), Scheduling Request ("SR"), Serving Gateway ("SGW"), Session Management Function ("SMF"), System Information Block ("SIB"), Tracking Area ("TA"), Transport Block ("TB"), Transport Block Size ("TBS"), Time-Division Duplex ("TDD"), Time Division Multiplex ("TDM"), Transmission and Reception Point ("TRP"), Transmit ("TX"), Trusted Non-3GPP Access Network ("TNAN"), Trusted Non-3GPP Access Point ("TNAP"), Trusted Non-3GPP Gateway Function ("TNGF"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

In 3GPP networks, a non-3GPP access network may implement an interworking function (e.g., TNGF or N3IWF) to connect to the 5G core network.

BRIEF SUMMARY

Methods for establishing a 5G data session over non-3GPP access with enhanced QoS are disclosed. Apparatuses and systems also perform the functions of the methods.

One method of a TNGF, e.g., for providing enhanced QoS via a non-3GPP access network, includes receiving a resource setup request from a network function in the mobile core network, the resource setup request identifying a plurality of QoS flows. Here, each QoS flow is associated with a list of QoS parameters. The method includes determining to establish at least one security association with the remote unit, each security association assigned to transfer a different set of QoS flows from the plurality of QoS flows. The method includes determining additional QoS information for each security association. Here, the additional QoS information for a security association is based on the list of QoS parameters of each QoS flow in the set of QoS flows assigned to be transferred on the security association. The method includes sending to the remote unit a Create Security Association request for each of the at least one security associations. Here, each Create Security Association request includes the determined additional QoS information for the security association.

One method of a UE, e.g., for providing enhanced QoS via a non-3GPP access network, includes receiving a Create Security Association request for each of at least one security association. Here, each Create Security Association request includes additional QoS information for the security association. The method includes reserving, for each Create Security Association request, at least one access resource in the access network based on the additional QoS information. The method includes sending a Create Security Association response to the gateway function for each Create Security Association request, each Create Security Association response indicating whether the corresponding security association is accepted.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
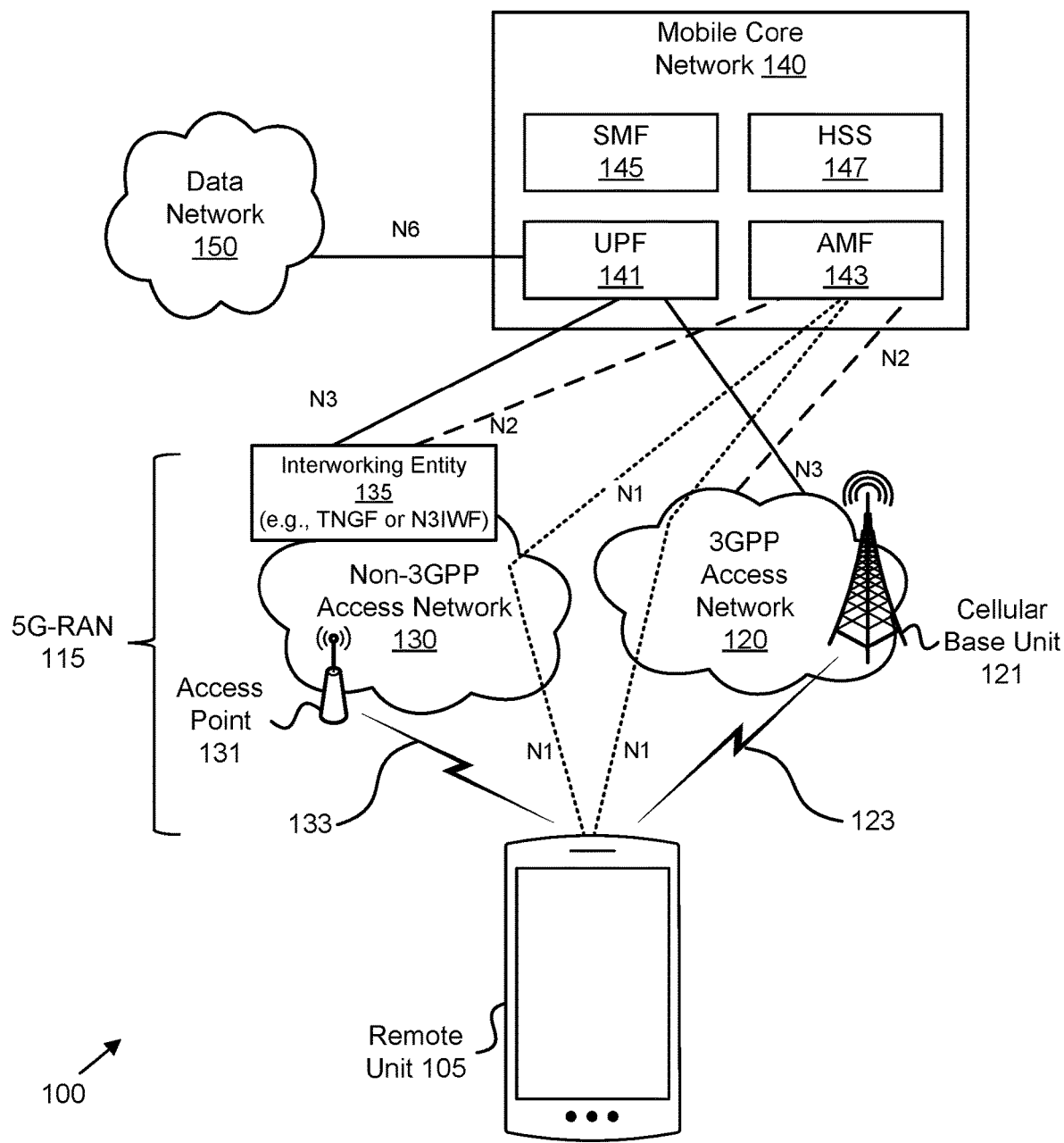
FIG. 1 is a schematic block diagram illustrating one embodiment of a system architecture for establishing a 5G data session over non-3GPP access with enhanced QoS.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Figure 2A:
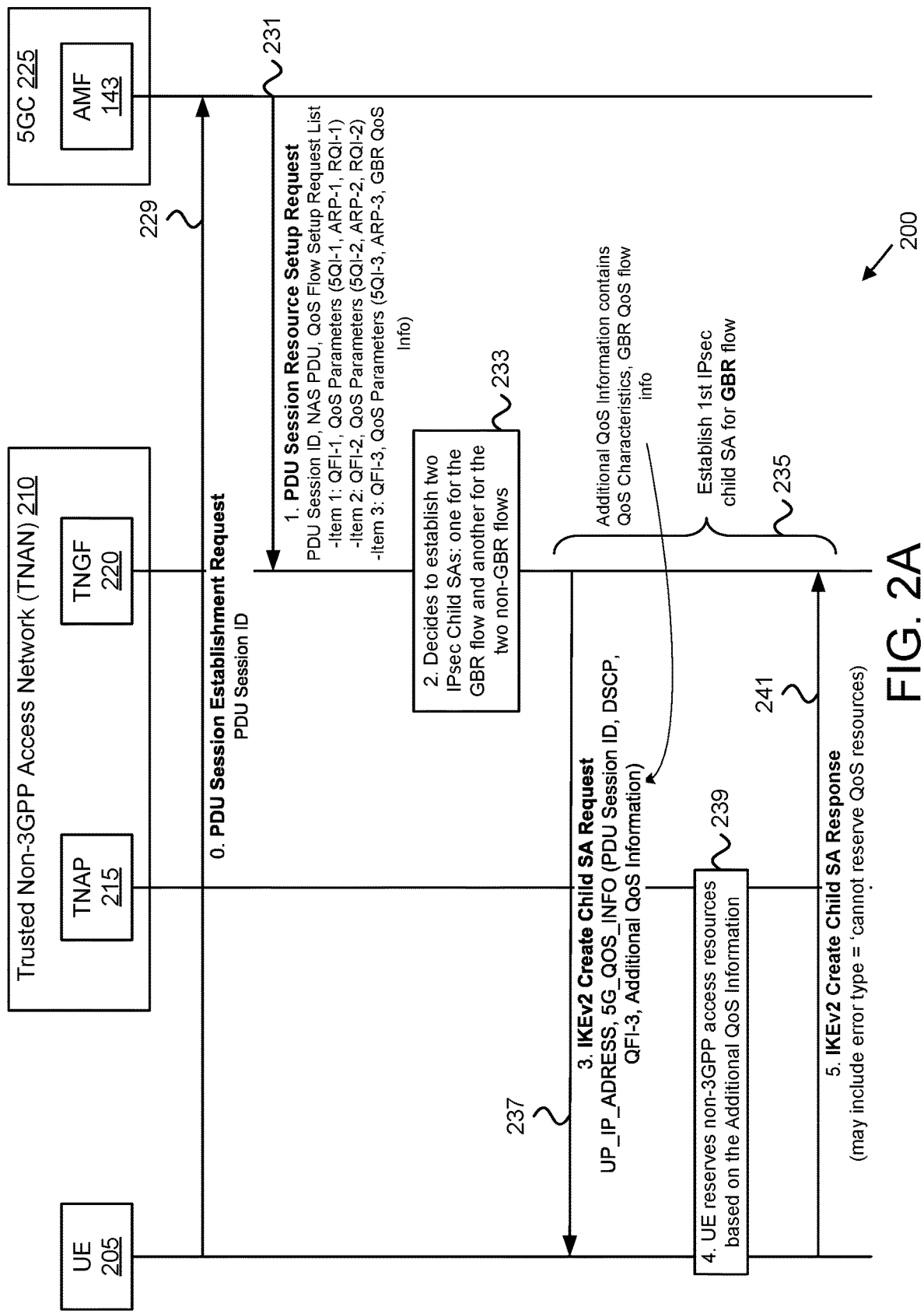
FIG. 2A is a block diagram illustrating one embodiment of a network procedure for PDU Session establishment via trusted non-3GPP access with three QoS flows.
Figure 2B:
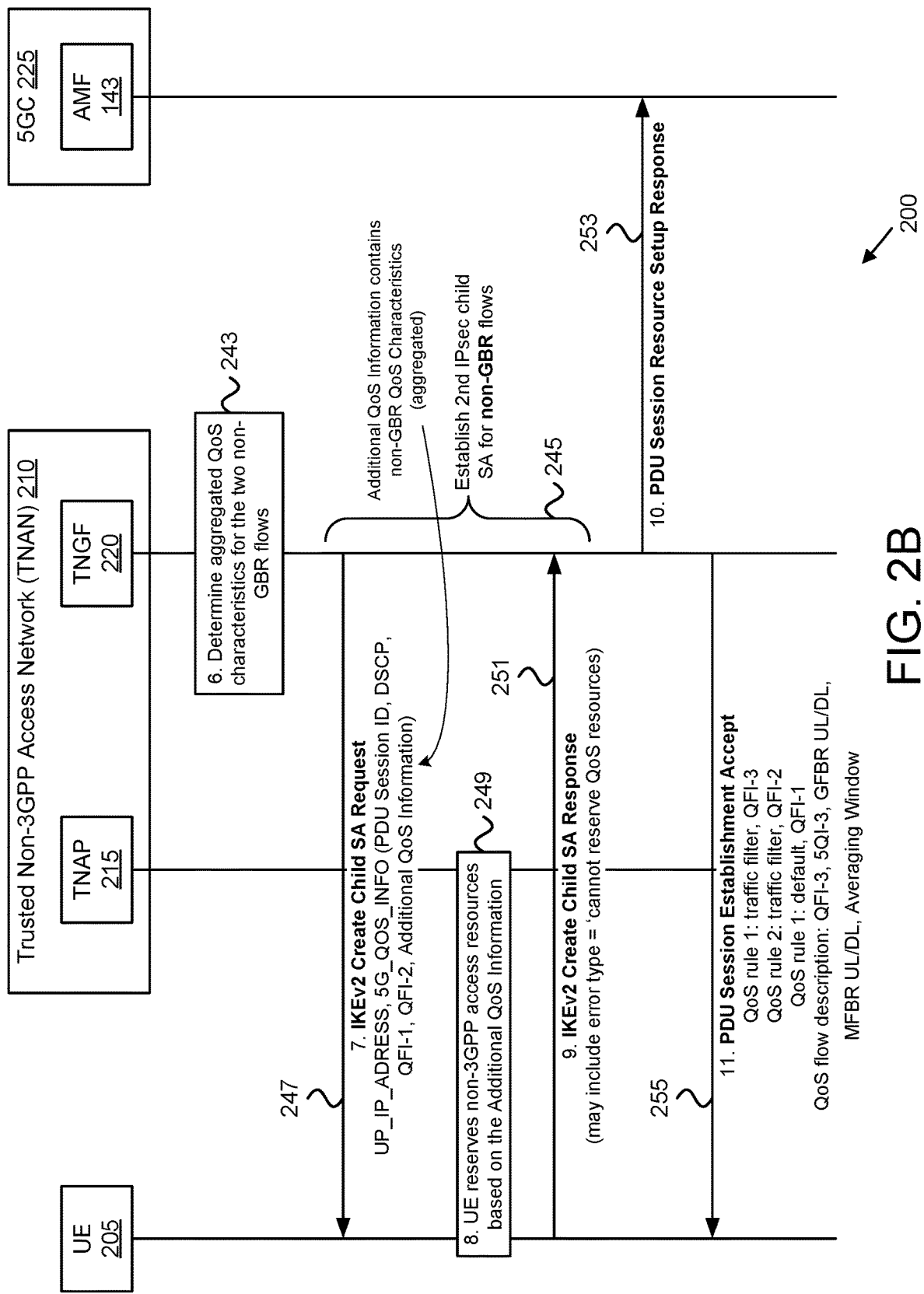
FIG. 2B is a continuation of FIG. 2A.
Figure 3:
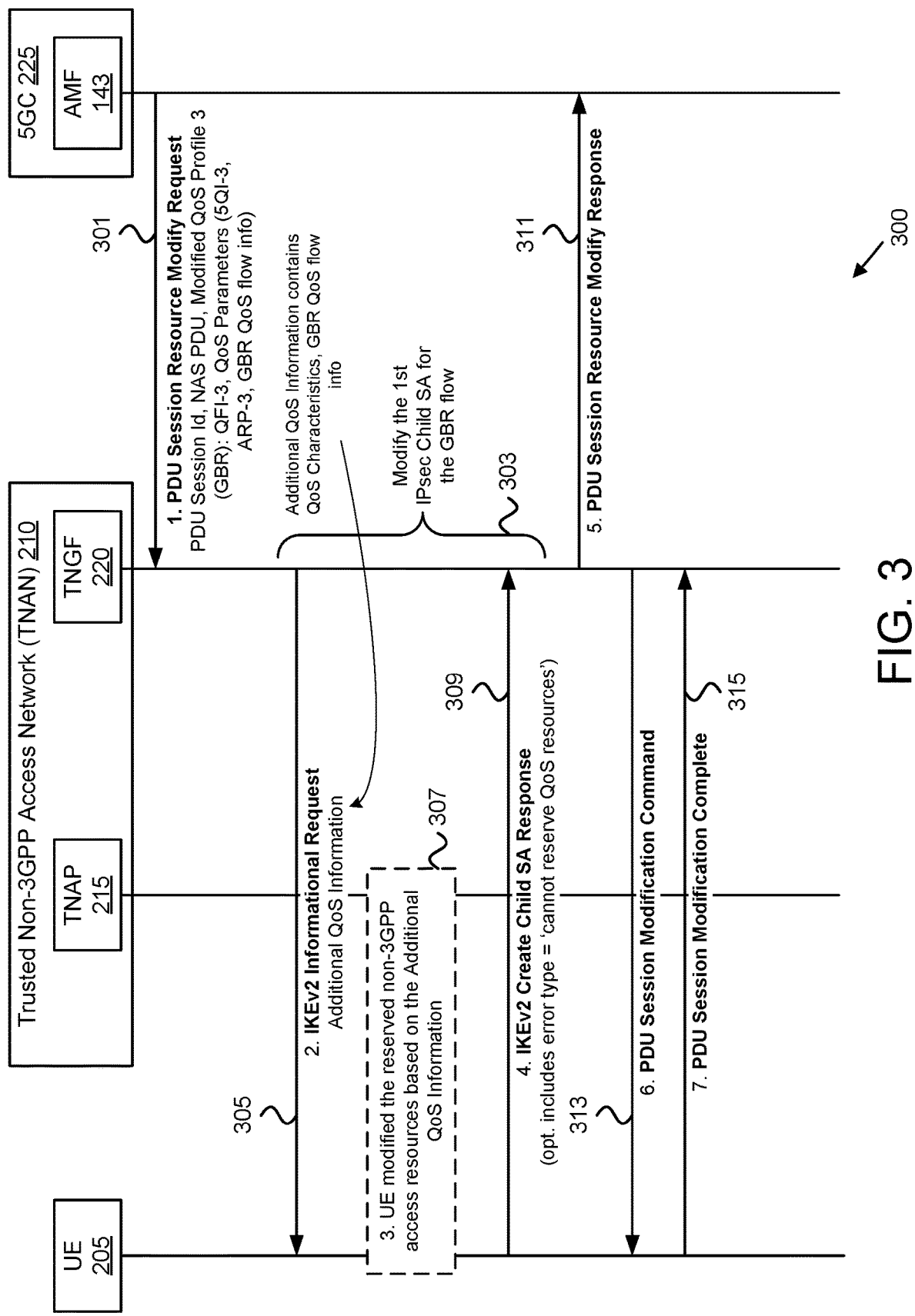
FIG. 3 is a block diagram illustrating one embodiment of a network procedure for PDU Session modification via trusted non-3GPP access.

Generally, the present disclosure describes systems, methods, and apparatus for providing enhanced QoS via a non-3GPP access network, including providing QoS support for GBR flows. An example of system architecture for providing enhanced QoS via a non-3GPP access network is shown in FIG. 1. An example of a procedure to establish a PDU Session over non-3GPP access networks is shown in FIGS. 2A-2B. An example of a procedure to modify a PDU Session over non-3GPP access networks is shown in FIG. 3.

FIG. 1 depicts a wireless communication system 100 for providing enhanced QoS via a non-3GPP access network, according to embodiments of the disclosure. In one embodiment, the wireless communication system 100 includes at least one remote unit 105, a 5G-RAN 115, and a mobile core network 140. The 5G-RAN 115 and the mobile core network form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150) via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and the remote host using the PDU session. Note that the remote unit 105 may establish one or more PDU sessions (or other data connections) with the mobile core network 140. A PDU Session may be defined by its parameters: [DNN, Type, SSC mode].

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a UPF ("UPF") 141.

The mobile core network 140 also includes multiple control plane functions including, but not limited to, an Access and Mobility Management Function ("AMF") 143 that serves both the 3GPP access network 120 and the non-3GPP access network 130, a Session Management Function ("SMF") 145, and a Home Subscriber Server ("HSS") 147. In certain embodiments, the mobile core network 140 may also include an Authentication Server Function ("AUSF"), a Policy and Control function ("PCF"), a Unified Data Management function ("UDM"), a Network Repository Function ("NRF") (used by the various NFs to discover and communicate with each other over APIs), or other NFs defined for the 5GC. Although specific numbers and types of network functions are depicted in FIG. 1, one of skill in the art will recognize that any number and type of network functions may be included in the mobile core network 140.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

FIGS. 2A-2B depict a PDU Session Establishment procedure 200 for providing enhanced QoS via a non-3GPP access network, according to embodiments of the disclosure. The procedure 200 describes specifies how a PDU Session can be established over non-3GPP access with enhanced QoS support. The procedure 200 involves the UE 205, a trusted non-3GPP access network ("TNAN") 210 (including a TNAP 215 and a TNGF 220), and the 5G core network ("5GC") 225 including an AMF 143 (other NFs in the 5GC 225 are not shown for ease of illustration).

The procedure 200 considers an example scenario where the UE 205 requests a PDU Session (i.e., data connection) and the network (e.g., AMF 143 in the 5GC 225) decides to establish three QoS flows for this PDU Session: One Guaranteed Bit Rate ("GBR") QoS flow and two non-GBR QoS flows. The difference between a GBR QoS flow and a non-GBR QoS flow is that a GBR QoS flow is associated with additional QoS parameters, including the Maximum Flow Bit Rate (for uplink and downlink), the Guaranteed Flow Bit Rate (for uplink and downlink) and the Maximum Packet Loss Rate (for uplink and downlink). In contrast, a non-GBR QoS is not associated with such QoS parameters, thus, the network does not need to provide guaranteed and maximum flow bit rates, neither a maximum packet loss rate for a non-GBR QoS flow.

Referring to FIG. 2A, the procedure 200 begins. At Step 0, the UE 205 sends a PDU Session Establishment Request message which is received and processed by the 5GC 225 (see messaging 229). In Step 1, after the PDU Session Establishment Request is accepted and the number of QoS flows for the PDU Session are determined, the TNGF 220 receives (via the AMF 143) a PDU Session Resource Setup Request message (see messaging 231). Here, the PDU Session Resource Setup Request message includes the PDU Session Identity, a NAS PDU (in this case, it contains a PDU Session Establishment Accept message) and a QoS Flow Setup Request List that specifies the QoS flows for the PDU Session.

In this example scenario, the QoS Flow Setup Request List includes three items, one for each of the three QoS flows of the PDU Session. Here, the first list item indicates a first QFI ("QFI-1") and corresponding QoS parameters for QFI-1 (non-GBR). Similarly, the second list item indicates a second QFI ("QFI-2") and corresponding QoS parameters for QFI-2 (also non-GBR). However, the first list item indicates a first QFI ("QFI-3") and corresponding QoS parameters for QFI-3 (a GBR QoS flow). Note that the third item includes GBR QoS information because the QFI-3 is a GBR QoS flow.

In Step 2, the TNGF 220 determines the number of IPsec Child Security Associations (SAs) to establish with the UE 205, and which QoS flows to assign to each child SA (see block 233). In the example scenario shown in the above figure, the TNGF 220 decides to establish a first IPsec child SA—which will carry the traffic of the GBR QoS flow—and establish a second IPsec child SA—which will carry the traffic of the two non-GBR QoS flows. Signaling flow to establish the first IPsec child SA is show in messaging 235, while signaling flow to establish the second IPsec child DA is shown in messaging 245.

For each of the two IPsec child SAs, the TNGF determines "Additional QoS Information." For the first IPsec child SA (which is to carry the traffic of the GBR QoS flow) the Additional QoS Information contains: A) the QoS Characteristics associated with the 5QI of the GBR flow; and B) GBR QoS Flow Information.

In various embodiments, the QoS Characteristics associated with the 5QI of the GBR flow (i.e., QFI-3) contain the QoS characteristics defined in 3GPP TS 23.501, clause 5.7.3, e.g., the Resource Type (i.e., GBR), the Priority Level, the Packet Delay Budget, the Packet Error Rate, etc. Here, the TNGF 220 may receive the QoS Characteristics via the AMF 143 (e.g., when the 5QI is a "dynamically assigned" 5QI). Alternatively, the TNGF 220 may be pre-configured with the QoS Characteristics associated with the 5QI of the GBR flow (e.g., when the 5QI is a "standardized" 5QI with known QoS characteristics).

In various embodiments, the GBR QoS Flow Information contains the parameters Maximum Flow Bit Rate (FBR) for UL/DL, Guaranteed FBR for UL/DL, optionally a Notification Control, and—optionally—Maximum Packet Loss Rate for UL/DL. These parameter may be as defined in 3GPP TS 38.413. The TNGF 220 receives the GBR QoS Flow Information via the AMF 143; see item 3 in the QoS Flow Setup Request List of step 1.

For the second IPsec child SA, which will carry the traffic of the two aggregated non-GBR QoS flows, the Additional QoS Information contains QoS Characteristics associated with the aggregated non-GBR flows. Note that in the case of non-GBR flows, the GBR QoS Flow Information is not included. In various embodiments, the QoS Characteristics associated with the 5QI of the non-GBR flow (i.e., QFI-1 and QFI-2) contain the QoS characteristics defined in 3GPP TS 23.501, clause 5.7.3, e.g., the Resource Type (i.e., non-GBR), the Priority Level, the Packet Delay Budget, the Packet Error Rate, etc. As with the QoS Characteristics associated with the GBR flow, the QoS Characteristic may be dynamically assigned (i.e., delivered to the TNGF 220) or standardized (i.e., pre-configured in the TGNF 220).

When the TNGF 220 aggregates multiple QoS flows in a single IPsec child SA, it derives the QoS Characteristics of the aggregated QoS flow by considering the QoS Characteristics of the individual QoS flows. This derivation may be performed in an implementation-specific way. As an example, the Priority Level in the QoS Characteristics of the aggregated QoS flows may be set to the highest Priority Level in the QoS Characteristics of all the individual QoS flows. Similarly, the Packet Error Rate in the QoS Characteristics of the aggregated QoS flows could be set to the smallest Packet Error Rate in the QoS Characteristics of all the individual QoS flows.

In step 3, the TNGF 220 sends to the UE 205 an IKEv2 Create Child SA Request message in order to establish the first IPsec Child SA (see messaging 237). This message includes, not only the parameters defined in Rel-15 (DSCP, QFI, etc.), but also the Additional QoS Information for the GBR flow, as described above.

In step 4, the UE 205 reserves non-3GPP access resources by using the received Additional QoS Information (see block 239). For example, in case of an IEEE 802.11 access, the UE 205 may request a new Traffic Stream (TS) by sending an 'ADDTS Request' message to the Access Point. This new TS may request the TNAP 215 to (a) provide guaranteed and maximum bit rates for the traffic sent over the first IPsec child SA according to the Guaranteed FBR and the Maximum FBR, respectively, in the Additional QoS Information, and (b) provide a delay bound for the traffic sent over the first IPsec child SA according to the Maximum Packet Loss Rate in the Additional QoS Information.

In step 5, the UE 205 responds to the TNGF 220 with an IKEv2 Create Child SA Response message, which whether the UE 205 accepts the new IPsec child SA or not (see messaging 241). If the UE 205 does not accept the IPsec child SA (e.g., because the necessary non-3GPP access resources could not be reserved in step 4), then the UE 205 includes a new error type in this message indicating that the IPsec child SA is rejected due to failure of QoS resource reservation. Note that at the time of invention, no such error type is defined in 3GPP specifications.

Continuing at FIG. 2B, in step 6, before establishing the second IPsec child SA, which aggregates the traffic of the two non-GBR QoS flows, the TNGF 220 may determine the aggregated Additional QoS Information, as described above with reference to step 2.

In step 7 the TNGF 220 sends to the UE 205 an IKEv2 Create Child SA Request message in order to establish the second IPsec Child SA (see messaging 247). This message includes, not only the parameters defined in Rel-15 (DSCP, QFI, etc.), but also the Additional QoS Information for the two aggregated non-GBR QoS flows, which is derived as described in step 2 above. Note that this message 247 contains two QoS Flow Identifiers (i.e., QFI-1 and QFI-2) indicating that the requested second IPsec child SA will multiplex the traffic of two different QoS flows. Additionally, the Resource Type in the QoS Characteristics indicates that these QoS flows are non-GBR QoS flows.

In step 8, the UE 205 reserves non-3GPP access resources by using the received Additional QoS Information (see block 249). For example, in case of an IEEE 802.11 access, the UE 205 may request a new Traffic Stream (TS) by sending an 'ADDTS Request' message to the Access Point. This new TS may request the TNAP 215 to transmit the traffic sent over the second IPsec child SA with a priority that is based on the Priority Level in the Additional QoS Information.

In step 9, the UE 205 responds to the TNGF 220 with an IKEv2 Create Child SA Response message, which indicates whether the UE 205 accepts the new IPsec child SA or not (see messaging 251). If the UE 205 does not accept the IPsec child SA (e.g., because the necessary non-3GPP access resources could not be reserved in step 8), then the UE 205 includes the new error type in this message indicating that the IPsec child SA is rejected due to failure of QoS resource reservation.

In step 10, the TNGF 220 responds to the message received from the AMF 143 in step 1 by sending a PDU Session Resource Setup Response (see messaging 253). Here, the PDU Session Resource Setup Response indicates whether the necessary access-network resources have been successfully reserved to support the QoS flows of the PDU Session.

In step 11, the TNGF 220 responds to the PDU Session Establishment request by forwarding the NAS PDU received in step 1 (i.e., the PDU Session Establishment Accept message) to the UE 205 (see messaging 255). This indicates to the UE 205 that the requested PDU Session was successfully established. The PDU Session Establishment request message includes QoS rules which indicate how the uplink traffic of the PDU Session is to be mapped to the three established QoS flows. For example, a QoS rule may indicate that IP traffic with destination address='a.b.c.d' should be sent over the QoS flow with QFI=QFI-3, i.e., over the GBR QoS flow and, thus, over the first IPsec child SA, which is associated with QFI-3.

Note that FIGS. 2A-2B illustrates a case where the UE 205 communicates with the 5G core network 225 via a TNAN 210, thus, it shows a Trusted Non-3GPP Gateway Function ("TNGF") as the access gateway (i.e., interworking entity) serving the UE 205. However, it is also applicable to the case where the UE communicates with the 5G core network 225 via an untrusted non-3GPP access network. In this alternate case, an access point in the untrusted non-3GPP access network connects to the 5GC 225 via a Non-3GPP Interworking Function ("N3IWF"). Here, the PDU Session Establishment procedure 200 may be implemented with the N3IWF replacing the illustrated TNGF as the access gateway serving the UE 205.

FIG. 3 depicts a PDU Session Modification procedure 300 for providing enhanced QoS via a non-3GPP access network, according to embodiments of the disclosure. The procedure 300 is used (a) to modify the QoS associated with one or more existing QoS flows, (b) to establish a new QoS flow, or (c) to delete an existing QoS flow. In the depicted example, the PDU Session Modification procedure 300 is used in order to modify the QoS parameters associated with the established GBR QoS flow (i.e., QFI-3). The procedure 300 involves the UE 205, a TNAN 210 (including a TNAP 215 and a TNGF 220), and the 5GC 225 including an AMF 143 (other NFs in the 5GC 225 are not shown for ease of illustration).

Referring to FIG. 3, the procedure 300 begins. Here, it is assumed that the UE 205 has already established a PDU Session with the 5GC 225 via the TNAN 210, e.g., using the procedure 200 described above. In step 1, the TNGF 220 receives via the AMF 143 a PDU Session Resource Modify Request message (see messaging 301). The PDU Session Resource Modify Request includes the PDU Session Identity, a NAS PDU (in this case, it contains a PDU Session Modification Command message) and a Modified QoS profile. In this example scenario, the Modified QoS profile relates to QoS profile 3 (i.e., GBR QoS flow) and includes parameters of the modified QoS profile, including the QFI (here, QFI-3) and new/modified QoS parameters (depicted here as including 5QI-3, ARP-3, and GBR QoS Flow information). Example signaling flow to modify the first IPsec child SA (mapped to the QFI-3) is show in messaging 303.

In step 2, for modifying the QoS parameters associated with the GBR QoS flow, which is mapped to the first IPsec child SA, the TNGF 220 sends an IKEv2 Informational Request message to the UE 205 over the first IPsec child SA (see messaging 305). This message contains, not only the parameters defined in Rel-15 (DSCP, QFI, etc.), but also the Additional QoS Information specified above. In this case, the Additional QoS Information may contain new QoS Characteristics (if the 5QI changed) and new GBR QoS Flow Information for the GBR QoS flow. As an example, new GBR QoS Flow Information may be provided to change the guaranteed Flow Bit Rate (FBR) associated with the GBR QoS flow.

In step 3, based on the received Additional QoS Information, the UE 205 may modify the non-3GPP access resources reserved for the first IPsec child SA (see block 307). In step 4, the UE 205 responds to the TNGF 220 with an IKEv2 Informational Response indicating if the resource modification was successful or not (see messaging 309). If the resource modification was unsuccessful, then the UE 205 includes a new error type in this message indicating that the IPsec child SA modification is rejected due to failure of QoS resource reservation. Note that at the time of invention, no such error type is defined in 3GPP specifications.

In step 5, the TNGF 220 responds to the message received in step 1 with a PDU Session Resource Modify Response, indicating whether the necessary access-network resources have been successfully reserved to support the QoS flows of the PDU Session (see messaging 311). In step 6, the TNGF 220 forwards the NAS PDU received in step 1 (i.e., the PDU Session Modification Command message) to the UE 205 (see messaging 313). In step 7, the UE 205 acknowledges the PDU Session Modification Command message by sending a PDU Session Modification Complete message (see messaging 315).

Note that FIG. 3 illustrates a case where the UE 205 communicates with the 5G core network 225 via a TNAN 210, thus, it shows a TNGF as the access gateway (i.e., interworking entity) serving the UE 205. However, it is also applicable to the case where the UE communicates with the 5G core network 225 via an untrusted non-3GPP access network. In this alternate case, an access point in the untrusted non-3GPP access network connects to the 5GC 225 via a N3IWF. Here, the PDU Session Establishment procedure 200 may be implemented with the N3IWF replacing the illustrated TNGF as the access gateway serving the UE 205.

Figure 4:
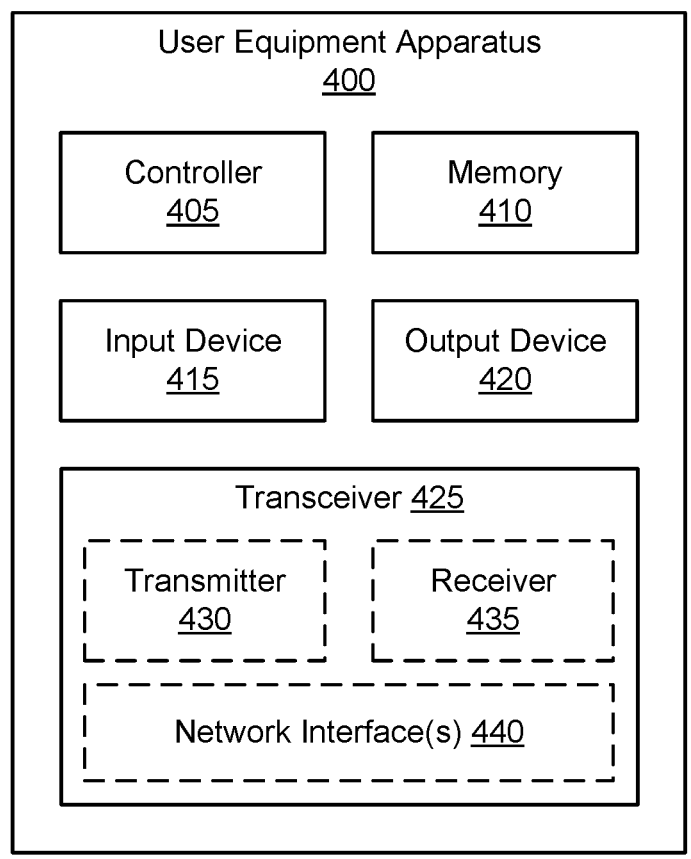
FIG. 4 is a schematic block diagram illustrating one embodiment of a user equipment apparatus for establishing a 5G data session over non-3GPP access with enhanced QoS.

FIG. 4 depicts one embodiment of a user equipment apparatus 400 that may be used for providing enhanced QoS via a non-3GPP access network, according to embodiments of the disclosure. The user equipment apparatus 400 may be one embodiment of the remote unit 105. Furthermore, the user equipment apparatus 400 may include a processor 405, a memory 410, an input device 415, an output device 420, a transceiver 425. In some embodiments, the input device 415 and the output device 420 are combined into a single device, such as a touch screen. In certain embodiments, the user equipment apparatus 400 does not include any input device 415 and/or output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, the first transceiver 425, and the second transceiver 430.

In various embodiments, the processor 405 controls the user equipment apparatus 400 to implement the above described UE behaviors. In some embodiments, the processor 405 that receives a create security association request for each of at least one security association. Here, each create security association request includes additional QoS information for the security association. The processor 405 reserves, for each create security association request, at least one access resource in the access network based on the additional QoS information and sends a create security association response to the gateway function for each create security association request, each create security association response indicating whether the corresponding security association is accepted.

In some embodiments, the processor 405 determines a failure of access resource reservation for a first Security Association. In such embodiments, sending the create security association response for the first Security Association comprises including an error type indicating the first Security Association request is rejected due to resource reservation failure.

In some embodiments, the processor 405 further receives a modification request to modify access resources. Here, the modification request identifying a security association corresponding a modified QoS flow. Additionally, the modification request further includes modified additional QoS information for the identified security association. In such embodiments, the processor 405 modifies an access resource reservation for the identifies security association.

In some embodiments, receiving a create security association request for each of at least one security association comprises receiving a first create security association request for a GBR QoS flow and receiving a second create security association request for a non-GBR QoS flow. In certain embodiments, the first Security Association aggregates multiple GBR QoS flows and wherein the additional QoS information for the first Security Association is based on a list of QoS parameters of each GBR QoS flow in the multiple GBR QoS flows. In certain embodiments, the second Security Association aggregates multiple non-GBR QoS flows and wherein the additional QoS information for the second Security Association is based on a list of QoS parameters of each non-GBR QoS flow in the multiple non-GBR QoS flows.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to providing enhanced QoS via a non-3GPP access network, for example storing control plane connection contexts, user plane connection contexts, VLAN identifiers, correlation between connections and VLAN identifiers, and the like. In certain embodiments, the memory 410 also stores program code and related data, such as an operating system ("OS") or other controller algorithms operating on the user equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. In certain embodiments, the one or more transmitters 430 and/or the one or more receivers 435 may share transceiver hardware and/or circuitry. For example, the one or more transmitters 430 and/or the one or more receivers 435 may share antenna(s), antenna tuner(s), amplifier(s), filter(s), oscillator(s), mixer(s), modulator/demodulator(s), power supply, and the like.

In various embodiments, the transceiver 425 is configured to communication with 3GPP access network(s) 120 and the non-3GPP access network(s) 130. In some embodiments, the transceiver 425 implements modem functionality for the 3GPP access network(s) 120 and/or the non-3GPP access network(s) 130. In one embodiment, the transceiver 425 implements multiple logical transceivers using different communication protocols or protocol stacks, while using common physical hardware.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. Additionally, the transceiver 425 may support at least one network interface 440. Here, the at least one network interface 440 facilitates communication with a RAN node, such as an eNB or gNB, for example using the "Uu" interface (e.g., LTE-Uu for eNB, NR-Uu for gNB). Additionally, the at least one network interface 440 may include an interface used for communications with one or more network functions in the mobile core network, such as a UPF 141, an AMF 143, and/or a SMF 145.

In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an application-specific integrated circuit ("ASIC"), or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module. In certain embodiments, the transceiver 425 may implement a 3GPP modem (e.g., for communicating via NR or LTE access networks) and a non-3GPP modem (e.g., for communicating via Wi-Fi or other non-3GPP access networks).

Figure 5:
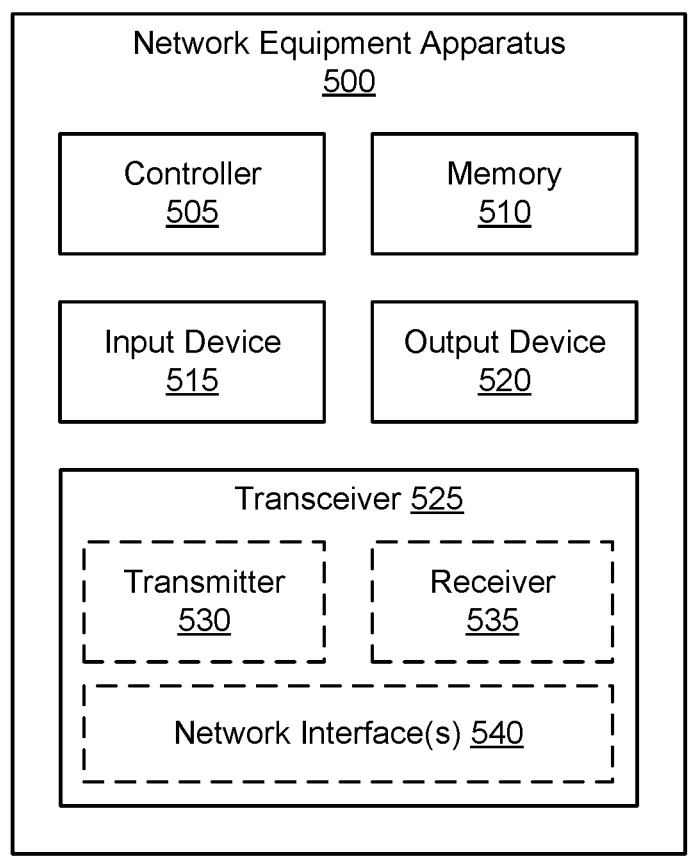
FIG. 5 is a schematic block diagram illustrating one embodiment of a network equipment apparatus for establishing a 5G data session over non-3GPP access with enhanced QoS.

FIG. 5 depicts one embodiment of a network equipment apparatus 500 that may be used for providing enhanced QoS via a non-3GPP access network, according to embodiments of the disclosure. In some embodiments, the network equipment apparatus 500 may be one embodiment of an access gateway, such as the interworking entity 135, the TNGF 215, and/or the like. Furthermore, the network equipment apparatus 500 may include a processor 505, a memory 510, an input device 515, an output device 520, and a transceiver 525. In some embodiments, the input device 515 and the output device 520 are combined into a single device, such as a touchscreen. In certain embodiments, the network equipment apparatus 500 may not include any input device 515 and/or output device 520.

As depicted, the transceiver 525 includes at least one transmitter 530 and at least one receiver 535. Additionally, the transceiver 525 may support at least one network interface 540, such as an "N3" interface used for communications between a user plane function (e.g., the UPF 141) and an access network node (e.g., the interworking entity 135), and the like.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the network equipment apparatus 500 to implement the above described TNGF and/or N3IWF behaviors. In some embodiments, the processor 505 that receives a resource setup request from a network function in the mobile core network (e.g., an AMF), the resource setup request identifying a plurality of QoS flows. Here, each QoS flow is associated with a list of QoS parameters. The processor 505 determines to establish at least one security association with the remote unit, each security association assigned to transfer a different set of QoS flows from the plurality of QoS flows and determines additional QoS information for each security association. Here, the additional QoS information for a security association is based on the list of QoS parameters of each QoS flow in the set of QoS flows assigned to be transferred on the security association. Via a network interface 540, the processor 505 sends to the remote unit a create security association request for each of the at least one security associations. Here, each create security association request includes the determined additional QoS information for the security association.

In some embodiments, the processor 505 receives a resource modify request from the network function. Here, the resource modify request identifies at least one of the plurality of QoS flows, wherein each identified QoS flow is associated with a set of at least one modified QoS parameters. In such embodiments, the processor 505 identifies a security association corresponding to each modified QoS flow and determines additional QoS information for each security association, wherein the additional QoS information for a security association is based on the list of QoS parameters of each QoS flow in the set of QoS flows assigned to be transferred on the security association. In certain embodiments, the processor 505 sends to the remote unit a request to modify access resources, the request to modify access resources including the modified additional QoS information.

In some embodiments, the plurality of QoS flows includes multiple non-GBR QoS flows. In such embodiments, the processor 505 determines to establish a first Security Association with the remote unit, the first Security Association assigned to transfer the multiple non-GBR QoS flows. Further, the processor 505 determines aggregated QoS characteristics for the first Security Association. Here, the aggregated QoS characteristics are based on the list of QoS parameters of each non-GBR QoS flow in the multiple non-GBR QoS flows. Additionally, the processor 505 determines additional QoS information for the first Security Association based on the aggregated QoS characteristics.

In some embodiments, the plurality of QoS flows includes multiple GBR QoS flows. In such embodiments, the processor 505 determines to establish a first Security Association with the remote unit, the first Security Association assigned to transfer the multiple GBR QoS flows. Further, the processor 505 determines aggregated QoS characteristics for the first Security Association. Here, the aggregated QoS characteristics are based on the list of QoS parameters of each GBR QoS flow in the multiple GBR QoS flows. Additionally, the processor 505 determines additional QoS information for the first Security Association based on the aggregated QoS characteristics.

In some embodiments, the processor 505 further determines to establish a first Security Association with the remote unit for a GBR QoS flow and a second Security Association with the remote unit for a non-GBR QoS flow. In certain embodiments, the first Security Association aggregates multiple GBR QoS flows. In certain embodiments, the second Security Association aggregates multiple non-GBR QoS flows.

In some embodiments, the processor 505 further receives a response from the remote unit for a security association, the response indicating that the remote unit successfully reserved resources for the security association using the additional QoS information for the security association. In some embodiments, the processor 505 further receives a response from the remote unit for a security association, the response including an error type indicating that the remote unit is unable to accept the create security association request due to resource reservation failure for the security association using the additional QoS information for the security association.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to providing enhanced QoS via a non-3GPP access network, for example storing control plane connection contexts, user plane connection contexts, VLAN identifiers, correlation between connections and VLAN identifiers, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

The transceiver 525 communicates with one or more access network nodes and/or with one or more network functions of a mobile communication network. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535. As discussed above, the transceiver 525 may support one or more the network interface 540 for communicating with network functions in a mobile core network.

Figure 6:
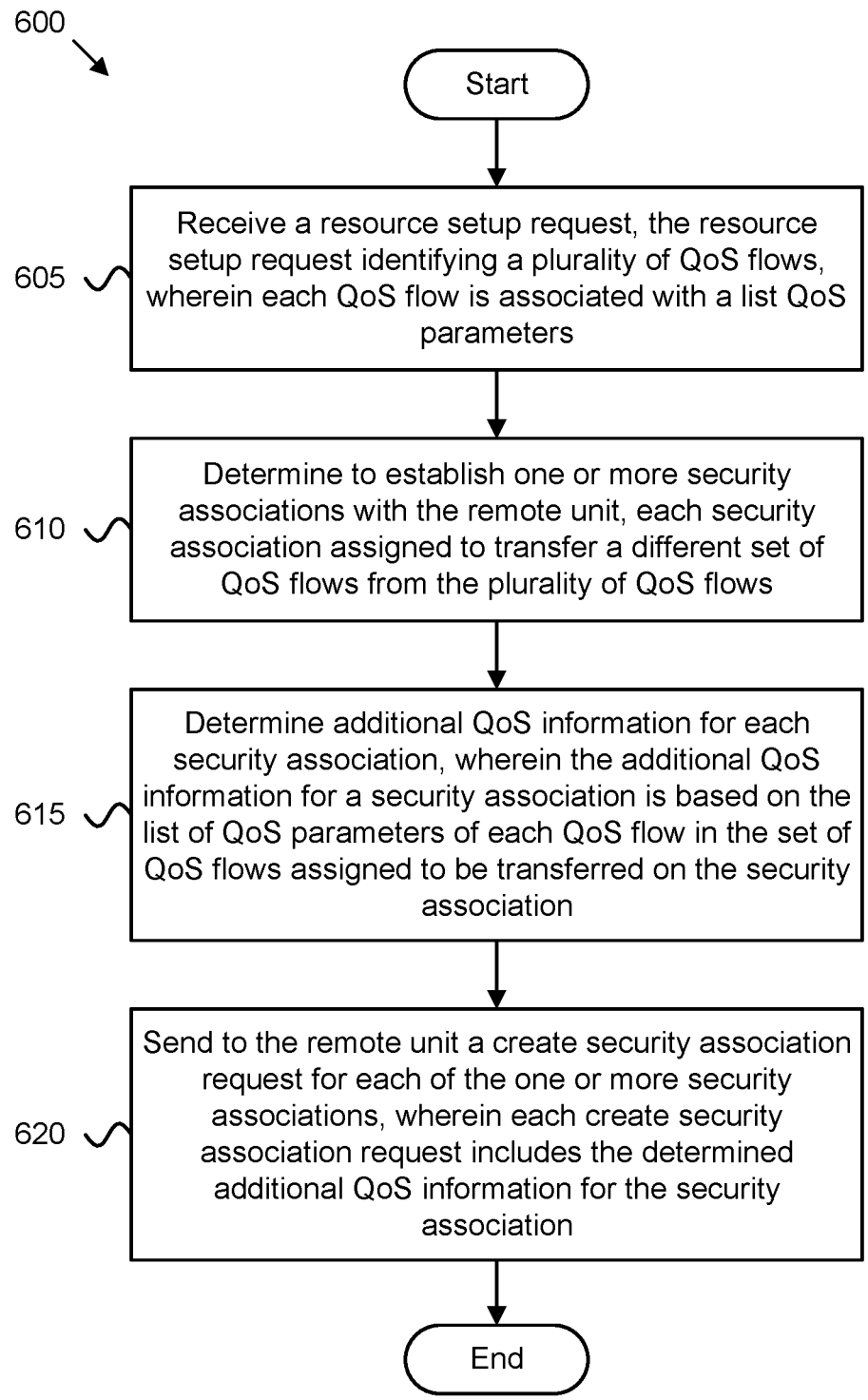
FIG. 6 is a flow chart diagram illustrating one embodiment of a first method for establishing a 5G data session over non-3GPP access with enhanced QoS.

FIG. 6 depicts a method 600 for providing enhanced QoS via a non-3GPP access network, according to embodiments of the disclosure. In some embodiments, the method 600 is performed by a gateway apparatus, such as the interworking entity 135, the TNGF 220, and/or the network equipment apparatus 500. In certain embodiments, the method 600 may be performed by a processor executing program code, for example, a microcontroller, a microprocessor, a CPU, a GPU, an auxiliary processing unit, a FPGA, or the like.

The method 600 begins and receives 605 a resource setup request from a network function in the mobile core network, the resource setup request identifying a plurality of QoS flows. Here, each QoS flow is associated with a list of QoS parameters. The method 600 includes determining 610 to establish at least one security association with the remote unit, each security association assigned to transfer a different set of QoS flows from the plurality of QoS flows.

The method 600 includes determining 615 additional QoS information for each security association. Here, the additional QoS information for a security association is based on the list of QoS parameters of each QoS flow in the set of QoS flows assigned to be transferred on the security association. The method 600 includes sending 620 to the remote unit a create security association request for each of the at least one security associations. Here, each create security association request includes the determined additional QoS information for the security association. The method 600 ends.

Figure 7:
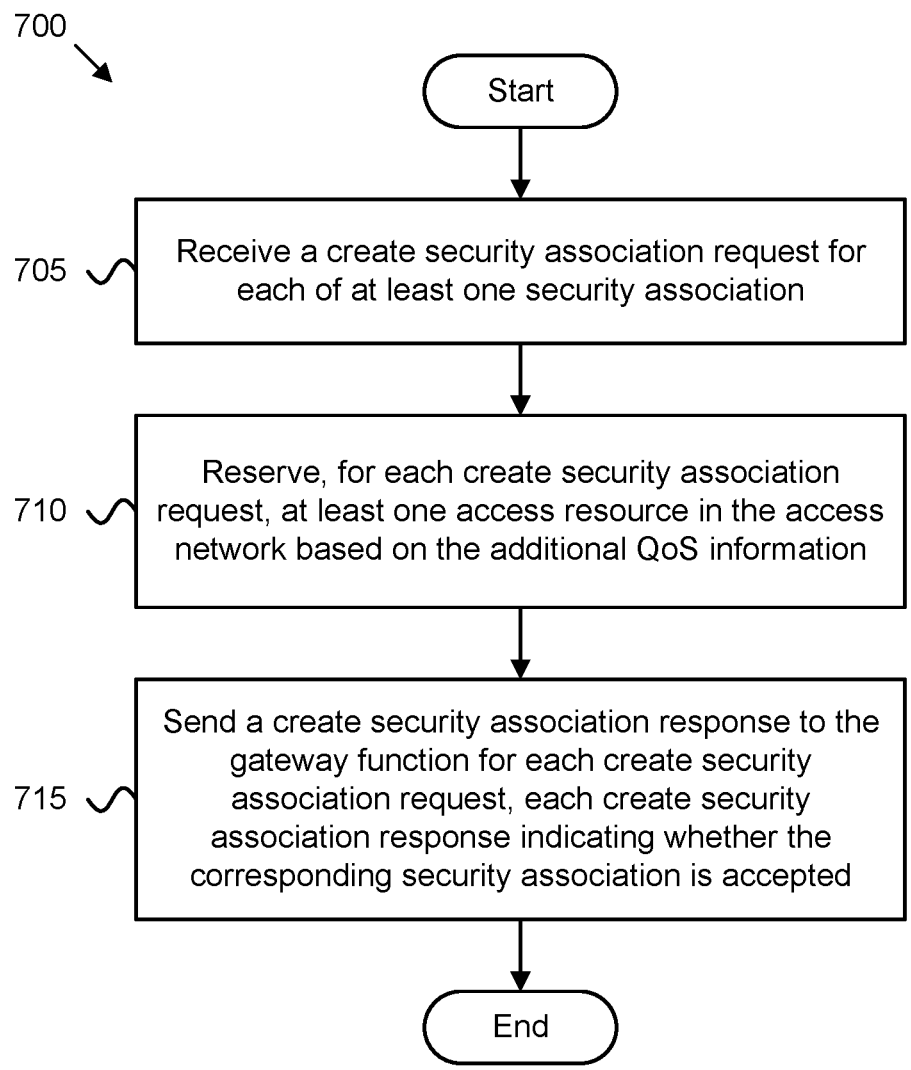
FIG. 7 is a flow chart diagram illustrating one embodiment of a second method for establishing a 5G data session over non-3GPP access with enhanced QoS.

FIG. 7 depicts one embodiment of a method 700 for providing enhanced QoS via a non-3GPP access network, according to embodiments of the disclosure. In various embodiments, the method 700 is performed by a UE, such as the remote unit 105, the UE 205 and/or the user equipment apparatus 400, described above. In some embodiments, the method 700 is performed by a processor, such as a microcontroller, a microprocessor, a CPU, a GPU, an auxiliary processing unit, a FPGA, or the like.

The method 700 begins and receives 705 a create security association request for each of at least one security association. Here, each create security association request includes additional QoS information for the security association. The method 700 includes reserving 710, for each create security association request, at least one access resource in the access network based on the additional QoS information. The method 700 includes sending 715 a create security association response to the gateway function for each create security association request, each create security association response indicating whether the corresponding security association is accepted. The method 700 ends.

Disclosed herein is a first apparatus for providing enhanced QoS via a non-3GPP access network, according to embodiments of the disclosure. The first apparatus may be implemented by a gateway apparatus, such as the interworking entity 135, the TNGF 220, and/or the network equipment apparatus 500. The first apparatus includes a network interface that communicates with a remote unit over a non-3GPP access network and communicates with a mobile core network. The first apparatus includes a processor that receives a resource setup request from a network function in the mobile core network, the resource setup request identifying a plurality of QoS flows. Here, each QoS flow is associated with a list of QoS parameters. The processor determines to establish at least one security association with the remote unit, each security association assigned to transfer a different set of QoS flows from the plurality of QoS flows and determines additional QoS information for each security association. Here, the additional QoS information for a security association is based on the list of QoS parameters of each QoS flow in the set of QoS flows assigned to be transferred on the security association. Via the network interface, the processor sends to the remote unit a Create Security Association request for each of the at least one security associations. Here, each Create Security Association request includes the determined additional QoS information for the security association.

In some embodiments, the processor receives a resource modify request from the network function. Here, the resource modify request identifies at least one of the plurality of QoS flows, wherein each identified QoS flow is associated with a set of at least one modified QoS parameters. In such embodiments, the processor identifies a security association corresponding to each modified QoS flow and determines additional QoS information for each security association, wherein the additional QoS information for a security association is based on the list of QoS parameters of each QoS flow in the set of QoS flows assigned to be transferred on the security association. In certain embodiments, the processor sends to the remote unit a request to modify access resources, the request to modify access resources including the modified additional QoS information.

In some embodiments, the plurality of QoS flows includes multiple non-GBR QoS flows. In such embodiments, the processor determines to establish a first Security Association with the remote unit, the first Security Association assigned to transfer the multiple non-GBR flows. Further, the processor determines aggregated QoS characteristics for the first Security Association. Here, the aggregated QoS characteristics are based on the list of QoS parameters of each non-GBR flow in the multiple non-GBR flows. Additionally, the processor determines additional QoS information for the first Security Association based on the aggregated QoS characteristics.

In some embodiments, the plurality of QoS flows includes multiple GBR QoS flows. In such embodiments, the processor determines to establish a first Security Association with the remote unit, the first Security Association assigned to transfer the multiple GBR flows. Further, the processor determines aggregated QoS characteristics for the first Security Association. Here, the aggregated QoS characteristics are based on the list of QoS parameters of each GBR flow in the multiple GBR flows. Additionally, the processor determines additional QoS information for the first Security Association based on the aggregated QoS characteristics.

In some embodiments, the processor further determines to establish a first Security Association with the remote unit for a GBR flow and a second Security Association with the remote unit for a non-GBR flow. In certain embodiments, the first Security Association aggregates multiple GBR flows. In certain embodiments, the second Security Association aggregates multiple non-GBR flows.

In some embodiments, the processor further receives a response from the remote unit for a security association, the response indicating that the remote unit successfully reserved resources for the security association using the additional QoS information for the security association. In some embodiments, the processor further receives a response from the remote unit for a security association, the response including an error type indicating that the remote unit is unable to accept the Create Security Association request due to resource reservation failure for the security association using the additional QoS information for the security association.

Disclosed herein is a first method for providing enhanced QoS via a non-3GPP access network, according to embodiments of the disclosure. The first method may be performed by a gateway apparatus, such as the interworking entity 135, the TNGF 220, and/or the network equipment apparatus 500. The first method includes receiving a resource setup request from a network function in the mobile core network, the resource setup request identifying a plurality of QoS flows. Here, each QoS flow is associated with a list of QoS parameters. The first method includes determining to establish at least one security association with the remote unit, each security association assigned to transfer a different set of QoS flows from the plurality of QoS flows. The first method includes determining additional QoS information for each security association. Here, the additional QoS information for a security association is based on the list of QoS parameters of each QoS flow in the set of QoS flows assigned to be transferred on the security association. The first method includes sending to the remote unit a Create Security Association request for each of the at least one security associations. Here, each Create Security Association request includes the determined additional QoS information for the security association.

In some embodiments, the first method includes receiving a resource modify request from the network function, the resource modify request identifying at least one of the plurality of QoS flows. Here, each identified QoS flow is associated with a set of at least one modified QoS parameters. In such embodiments, the first method includes identifying a security association corresponding to each modified QoS flow and determining additional QoS information for each security association. Here, the additional QoS information for a security association is based on the list of QoS parameters of each QoS flow in the set of QoS flows assigned to be transferred on the security association. In certain embodiments, the first method further includes sending to the remote unit a request to modify access resources, the request to modify access resources including the modified additional QoS information.

In some embodiments, the plurality of QoS flows includes multiple non-GBR flows. In such embodiments, the first method further includes determining to establish a first Security Association with the remote unit, the first Security Association assigned to transfer the multiple non-GBR flows. Further, the first method includes determining aggregated QoS characteristics for the first Security Association. Here, the aggregated QoS characteristics are based on the list of QoS parameters of each non-GBR flow in the multiple non-GBR flows. Additionally, the first method includes determining additional QoS information for the first Security Association based on the aggregated QoS characteristics.

In some embodiments, the plurality of QoS flows includes multiple GBR QoS flows. In such embodiments, the first method includes determining to establish a first Security Association with the remote unit, the first Security Association assigned to transfer the multiple GBR flows. Further, the first method includes determining aggregated QoS characteristics for the first Security Association. Here, the aggregated QoS characteristics based on the list of QoS parameters of each GBR flow in the multiple GBR flows. Additionally, the first method includes determining additional QoS information for the first Security Association based on the aggregated QoS characteristics.

In some embodiments, the first method includes determining to establish a first Security Association with the remote unit for a GBR flow and a second Security Association with the remote unit for a non-GBR flow. In certain embodiments, the first Security Association aggregates multiple GBR flows. In certain embodiments, the second Security Association aggregates multiple non-GBR flows.

In some embodiments, the first method includes receiving a response from the remote unit for a security association, the response indicating that the remote unit successfully reserved resources for the security association using the additional QoS information for the security association. In some embodiments, the first method includes receiving a response from the remote unit for a security association, the response including an error type indicating that the remote unit is unable to accept the Create Security Association request due to resource reservation failure for the security association using the additional QoS information for the security association.

Disclosed herein is a second apparatus for providing enhanced QoS via a non-3GPP access network, according to embodiments of the disclosure. The second apparatus may be implemented by a UE, such as the remote unit 105, the UE 205 and/or the user equipment apparatus 400, described above. The second apparatus includes a transceiver that communicates with a gateway function in a non-3GPP access network. The second apparatus includes a processor that receives a Create Security Association request for each of at least one security association. Here, each Create Security Association request includes additional QoS information for the security association. The processor reserves, for each Create Security Association request, at least one access resource in the access network based on the additional QoS information and sends a Create Security Association response to the gateway function for each Create Security Association request, each Create Security Association response indicating whether the corresponding security association is accepted.

In some embodiments, the processor determines a failure of access resource reservation for a first Security Association. In such embodiments, sending the Create Security Association response for the first Security Association comprises including an error type indicating the first Security Association request is rejected due to resource reservation failure.

In some embodiments, the processor further receives a modification request to modify access resources. Here, the modification request identifying a security association corresponding a modified QoS flow. Additionally, the modification request further includes modified additional QoS information for the identified security association. In such embodiments, the processor modifies an access resource reservation for the identifies security association.

In some embodiments, receiving a Create Security Association request for each of at least one security association comprises receiving a first Create Security Association request for a GBR flow and receiving a second Create Security Association request for a non-GBR flow. In certain embodiments, the first Security Association aggregates multiple GBR flows and wherein the additional QoS information for the first Security Association is based on a list of QoS parameters of each GBR flow in the multiple GBR flows. In certain embodiments, the second Security Association aggregates multiple non-GBR flows and wherein the additional QoS information for the second Security Association is based on a list of QoS parameters of each non-GBR flow in the multiple non-GBR flows.

Disclosed herein is a second method for providing enhanced QoS via a non-3GPP access network, according to embodiments of the disclosure. The second method may be implemented by a UE, such as the remote unit 105, the UE 205 and/or the user equipment apparatus 400, described above. The second method includes receiving a Create Security Association request for each of at least one security association. Here, each Create Security Association request includes additional QoS information for the security association. The second method includes reserving, for each Create Security Association request, at least one access resource in the access network based on the additional QoS information. The second method includes sending a Create Security Association response to the gateway function for each Create Security Association request, each Create Security Association response indicating whether the corresponding security association is accepted.

In some embodiments, the second method includes determining a failure of access resource reservation for a first Security Association. In such embodiments, sending the Create Security Association response for the first Security Association comprises including an error type indicating the first Security Association request is rejected due to resource reservation failure.

In some embodiments, the second method includes receiving a modification request to modify access resources. Here, the modification request identifies a security association corresponding a modified QoS flow, the modification request further including modified additional QoS information for the identified security association. In such embodiments, the second method includes modifying an access resource reservation for the identifies security association.

In such embodiments, receiving a Create Security Association request for each of at least one security association comprises receiving a first Create Security Association request for a GBR flow and receiving a second Create Security Association request for a non-GBR flow. In certain embodiments, the first Security Association aggregates multiple GBR flows and wherein the additional QoS information for the first Security Association is based on a list of QoS parameters of each GBR flow in the multiple GBR flows. In certain embodiments, the second Security Association aggregates multiple non-GBR flows and wherein the additional QoS information for the second Security Association is based on a list of QoS parameters of each non-GBR flow in the multiple non-GBR flows.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a network interface that communicates with a remote unit over a non-3 GPP access network and communicates with a mobile core network; and
a processor that:
receives a resource setup request from a network function in the mobile core network, the resource setup request identifying a plurality of Quality of Service ("QoS") flows, wherein each QoS flow is associated with a list of QoS parameters;
determines to establish at least one security association with the remote unit, each security association assigned to transfer a different set of QoS flows from the plurality of QoS flows;
determines additional QoS information for each security association, wherein the additional QoS information for a security association is based on the list of QoS parameters of each QoS flow in the set of QoS flows assigned to be transferred on the security association; and
sends to the remote unit a create security association request for each of the at least one security associations, wherein each create security association request includes the determined additional QoS information for the security association.

2. The apparatus of claim 1, wherein the processor further:
receives a resource modify request from the network function, the resource modify request identifying at least one of the plurality of QoS flows, wherein each identified QoS flow is associated with a set of at least one modified QoS parameters;
identifies a security association corresponding to each modified QoS flow; and
determines additional QoS information for each security association, wherein the additional QoS information for a security association is based on the list of QoS parameters of each QoS flow in the set of QoS flows assigned to be transferred on the security association.

3. The apparatus of claim 2, wherein the processor further:
sends to the remote unit a request to modify access resources, the request to modify access resources including the modified additional QoS information.

4. The apparatus of claim 1, wherein the plurality of QoS flows includes multiple non-Guaranteed Bit Rate ("non-GBR") flows, wherein the processor further:
determines to establish a first security association with the remote unit, the first security association assigned to transfer the multiple of non-GBR flows;
determines aggregated QoS characteristics for the first security association, the aggregated QoS characteristics based on the list of QoS parameters of each non-GBR flow in the multiple non-GBR flows; and
determines additional QoS information for the first security association based on the aggregated QoS characteristics.

5. The apparatus of claim 1, wherein the plurality of QoS flows includes multiple Guaranteed Bit Rate ("GBR") flows, wherein the processor further:
determines to establish a first security association with the remote unit, the first security association assigned to transfer the multiple of GBR flows;
determines aggregated QoS characteristics for the first security association, the aggregated QoS characteristics based on the list of QoS parameters of each GBR flow in the multiple GBR flows; and
determines additional QoS information for the first security association based on the aggregated QoS characteristics.

6. The apparatus of claim 1, wherein the processor further:
determines to establish a first security association with the remote unit for a Guaranteed Bit Rate ("GBR") flow and a second security association with the remote unit for a non-GBR flow.

7. The apparatus of claim 6, wherein the first security association aggregates multiple GBR flows.

8. The apparatus of claim 6, wherein the second security association aggregates multiple non-GBR flows.

9. The apparatus of claim 1, wherein the processor further receives a response from the remote unit for a security association, the response indicating that the remote unit successfully reserved resources for the security association using the additional QoS information for the security association.

10. The apparatus of claim 1, wherein the processor further receives a response from the remote unit for a security association, the response including an error type indicating that the remote unit is unable to accept the create security association request due to resource reservation failure for the security association using the additional QoS information for the security association.

11. A method comprising:
receiving a resource setup request from a network function in the mobile core network, the resource setup request identifying a plurality of Quality of Service ("QoS") flows, wherein each QoS flow is associated with a list of QoS parameters;
determining to establish at least one security association with the remote unit, each security association assigned to transfer a different set of QoS flows from the plurality of QoS flows;
determining additional QoS information for each security association, wherein the additional QoS information for a security association is based on the list of QoS parameters of each QoS flow in the set of QoS flows assigned to be transferred on the security association; and
sending to the remote unit a create security association request for each of the at least one security associations, wherein each create security association request includes the determined additional QoS information for the security association.

12. The method of claim 11, further comprising:
receiving a resource modify request from the network function, the resource modify request identifying at least one of the plurality of QoS flows, wherein each identified QoS flow is associated with a set of at least one modified QoS parameters;
identifying a security association corresponding to each modified QoS flow;
determining additional QoS information for each security association, wherein the additional QoS information for a security association is based on the list of QoS parameters of each QoS flow in the set of QoS flows assigned to be transferred on the security association; and
sending a request to modify access resources to the remote unit, the request to modify access resources including the modified additional QoS information.

* * * * *